United States Patent [19]
Parent

[11] 3,944,710
[45] Mar. 16, 1976

[54] TRANSPARENCY
[75] Inventor: Richard A. Parent, Fairport, N.Y.
[73] Assignee: Xerox Corporation, Stamford, Conn.
[22] Filed: May 1, 1974
[21] Appl. No.: 465,964

[52] U.S. Cl. .................. 428/412; 96/1.4; 428/411; 428/480
[51] Int. Cl.² B32B 27/06; B32B 27/36; G03G 13/14
[58] Field of Search....... 117/47 R, 37 LE, 138.8 A, 117/138.8 B, 138.8 F, 211, 213; 96/1.4; 428/411, 412, 480

[56] References Cited
UNITED STATES PATENTS

| | | | |
|---|---|---|---|
| 2,944,918 | 7/1960 | Nagel et al............................ | 117/68.5 |
| 3,472,687 | 10/1969 | Masuda................................ | 117/211 |
| 3,485,738 | 12/1969 | Carreira................................ | 204/181 |
| 3,535,112 | 10/1970 | Dolce et al............................. | 96/1.4 |
| 3,539,340 | 11/1970 | Dolce et al............................. | 96/1.4 |
| 3,539,341 | 11/1970 | Dolce et al............................. | 96/1.4 |
| 3,549,360 | 12/1970 | O'Neill et al.......................... | 96/1.4 |
| 3,847,642 | 11/1974 | Rhodes................................. | 117/17.5 |
| 3,854,942 | 12/1974 | Akman................................. | 96/1.2 |

*Primary Examiner*—P. E. Willis, Jr.

[57] ABSTRACT

A transparency is disclosed, which is suitable for use in a multicolored xerographic reproduction process comprising a transparent, thermoplastic film sheet having at least one surface coated with a material selected from the group of long chain aliphatic hydrocarbons. The coated transparency, when used in a multicolored electrostatic copying process improves adhesion of the multicolored image thereon and permits reproduction of colors and color densities in said image which correspond well to the multicolored original copied.

3 Claims, No Drawings

TRANSPARENCY

BACKGROUND OF THE INVENTION

This invention relates to xerographic reproduction and specifically to transparencies which are suitable for use in a xerographic reproduction process.

Transparencies are a highly useful product in visual education since an image on a transparency may be projected with the necessary degree of magnification onto a screen where it may be viewed by a large number of persons. Transparencies have heretofore been made by photographic reproduction of the desired image and accordingly have required the skill of an individual who is familiar with complex photographic reproduction processes. Photographic reproduction of transparencies also requires the expenditure of a large amount of time and money and is thus undesirable for this reason. Therefore, an easy and inexpensive means for the production of transparencies has been sought whereby transparencies could be conveniently and economically imaged and then used an unlimited number of times in visual education programs.

The advent of xerography and electrostatic copying as generally disclosed by Carlson in U.S. Pat. No. 2,297,691 has proven to be a highly successful process for reproduction with the inherent advantages of speed and reliability. In a usual xerographic process, an electrostatic image of an object is formed on a recording member such as a xerographic plate or drum. The xerographic plate may comprise a layer of photoconductive material, such as selenium on a conductive metal backing. The latent electrostatic image which is formed on the photoconductive material is developed into a powder image which is then subsequently transferred to a sheet of paper and affixed thereon to form a permanent print.

The xerographic process has therefore proven to be an easy and reliable means for the production of transparencies. Transparencies made by a xerographic process are produced by forming an electrostatic image of the desired object, developing it, and then transferring it to a transparent sheet material with the image being permanently affixed or fused thereto by either the application of heat or by the action of a solvent vapor. In either case the toner which is used to develop the powdered image is coalesced on the sheet material by the fusing technique to form a permanent image thereon. Solvent fusion techniques, for transparent materials made by a xerographic process, for example, are illustrated in U.S. Pat. Nos. 3,049,810 and 3,148,078.

While the xerographic reproduction process is an apparent solution to the problem of economical and efficient production of transparencies, other problems have also been encountered with its use in the production of transparencies. One of the most pronounced problems with producing transparencies by an electrostatic copying process is to get the powdered or developed image to adhere well to a transparent film material before the image is permanently affixed thereto by fusing. Failure to achieve this results in an irregular substrate-toner interface resulting in extensive light scattering in projection and, therefore, loss in color. A further problem encountered is obtaining proper and uniform density of the image after fixing or fusion and without resultant damage to the transparent film material either in the fusion process or in the transfer system employed within the machine. For this reason, various coating and combinations thereof with various types of transparent sheet materials have been previously proposed to obviate some of these difficulties. Included are various single component polymeric coatings such as are exemplified in U.S. Pat. Nos. 3,539,341 and 3,535,112.

The above coatings, while of some assistance in improving adhesion of the developed electrostatic image to a transparent film material, nevertheless, are not entirely suitable when transparencies are produced by a multicolored xerographic imaging process. The difficulties encountered with a multicolored imaging process and transparencies produced thereby are due in part to the multicomponent pigmented and dyed developers required in the multicolored imaging process and their varying degree of attraction for the transparent sheet material. Furthermore, the problem of getting the correct degree of coalescence of the toner particles in the permanent image is an even more critical matter with multicolored imaging than with single color image development. This increased criticality is due to the fact that black or single color transparencies only require complete opaqueness or nonopaqueness to produce a transparency which has images suitable for projection.

Multicolored transparency images, on the other hand, must allow for a certain degree of color density for each color or color combination in the image which is sufficient and uniform enough to allow projection of a uniform and true color. This, therefore, requires a different and unique combination of materials being employed and more critical controls being imposed upon the transparent materials which are used in a multicolor xerographic imaging process to obtain the correct degree of attraction of toner to the transparent sheet as well as proper coalescence of toner particles for good consistent hue and color density.

The instant invention relates to a transparency which fulfills all the requirements for use in the production of multicolored electrophotographic images. The subject invention is particularly suited to overcome difficulties associated with the projection of color xerographic images which are formed on transparencies. In addition, the instant invention utilizes materials which are readily available and are relatively simple to work with. By means of the subject invention effective transparencies for use in a xerographic color process are easily prepared.

It is an object of the present invention to provide a transparency which is permanent in nature and having the sheet strength necessary to allow repeated use thereof for visual education purposes.

It is also an object of the present invention to provide for production of a color transparency by a xerographic multicolor imaging process which in turn eliminates the skill of a technician who is trained in reproduction photographic processing.

These and other objects, as well as the scope, nature and utilization of this invention will be apparent by the following detailed description and appended claims.

SUMMARY OF THE INVENTION

It has now been determined that the general objective of producing a transparency which will permanently hold a true and consistent multicolor xerographic image may be best achieved by utilizing a transparent, thermoplastic, film sheet such as a polysulfone, a polycarbonate, or a polyester sheet material, followed by the coating of this sheet prior to xerographic imaging with a long chain aliphatic hydrocarbon. It is this coating composition which has been found to insure that all colored pigments required in the multicolored reproduction process are properly attracted to and held by the transparent sheets during imaging and sheet transfer so that a permanent image having a uniform and accurate color densities may be then fused on the transparent sheet. This coating overcomes the previously noted difficulties with producing a transparency by a multicolored electrostatic copying process, among which are poor adherence of the developed xerographic image on the transparent film, as well as difficulty in insuring that a consistent and true color density is developed from the colored original which will also be suitable for projection or magnification on a screen. As indicated, these problems while existing with single color xerographic imaging, are even more pronounced when a multicolored xerographic process is employed.

DESCRIPTION OF THE PREFERRED EMBODIMENT

In the process of multicolored xerographic reproduction, a subtractive color to color reproduction technique is used to develop images formed on the photoconductive layer. Furthermore, a multicolor xerographic imaging process may also employ multiple scanning of the colored original at different wavelengths of light to produce multiple images corresponding to each primary color involved in the original. These primary color images may be then recombined to form a single multicolored image corresponding to the original by using a multicomponent or multicolored toner in a subtractive color to color reproduction process. A subtractive color to color reproduction process is illustrated in U.S. Pat. No. 3,057,720.

Toners which are employed in multicolor xerography use subtractive primary colors, yellow, cyan (blue green) and magenta. These in turn are used to reproduce a wide gamut of colors normally found in the colored original. For the purposes of illustration, when subtractive mixing of the yellow and cyan colorants take place, greens are obtained. Likewise, the mixing of magenta and yellow colorant in varying amounts reproduces reds, while combining the cyan with magenta results in the reproduction of blues. Mixtures of equal amounts of each toner, of course, will produce a black image.

Production of the multicolored copy from the colored original may be appropriately achieved by any multicolored xerographic imaging process. It is not intended that this invention be limited by particular variations in the multicolored xerographic imaging processes that might be employed or with the equipment used in said process. Nevertheless, for the purposes of illustration, a suitable process for color imaging begins with proper discernment of the color composition of the original subject matter and recording thereof. This may be conveniently accomplished by sequential optical scanning of the color original a number of times to formulate a sequence of the latent electrostatic images which correspond to the primary colors in the original. This is accomplished by the light image passing through an appropriate color filter so that the latent image is then in effect, color separated according to the various primary colors. Theoretically, the latent image which is formed by passing the light image through a green filter should require the magentas (the complementary color) as areas of relatively high charge density on the drum surface, while the green (the separated color) should cause a low-charged density level. The magentas are then made visible by applying a green absorbing magenta toner to the image bearing member. By the same token, a blue separation is developed with a cyan toner. The three developed color separations are then brought together in registration upon the final sheet of support material to produce a multicolored facsimile of the original colored document copy.

It is this multicomponent developer system used in a subtractive color to color reproduction process which presents numerous problems when, for example, a color transparency is produced thereby which will reproduce, with uniform and accurate consistency the color densities which correspond to the colored original.

In the production of transparencies by a multicolored xerographic imaging process according to the present invention, a transparent, thermoplastic film sheet is selected as the support material upon which the multicolored xerographic image is to be developed. Although the sheet material may be any suitable thermoplastic film material which has the clearness, strength and heat resistance to allow repeated projection thereof, materials which are particularly preferred for the present invention include thermoplastic resins such as the polysulfones, polycarbonates, and polyesters.

Thermoplastic sheet material which may be conveniently utilized in the present invention includes polysulfone sheet material which are commercially available from Rowland Products, Inc., Kensington, Connecticut and Instar Supply Co., Inc., New York, New York under the name Folacron PSN, as well as polycarbonate sheet materials commercially available from General Electric Corp., Waterford, New York under the names LEXAN SL1007 (a tetrachloro-polycarbonate) and LEXAN DL616 (a tetrabromo polycarbonate). These materials may be selected from any thickness range desired, although in selecting film thickness, the films should be thick enough to have the necessary strength but still be thin enough to remain flexible throughout continuous use thereof. A suitable thickness of the film suitable for use in xerographic imaging, will generally be 3 to 8 mils.

The thermoplastic film material is then coated with a long chain aliphatic hydrocarbon coating composition which has been found to significantly improve adhesion of a multicolored xerographic image to a transparency during the xerographic development process while at the same time during image fusion, permitting accurate reproduction of color density on the transparency. The coating in this regard has been found to assist in permanent fixing or fusing of the developed image to the transparency by either solvent vapor or heat fusion techniques.

The coating developed herein comprises a mixture of a long chain aliphatic hydrocarbon and a suitable solvent for coating purposes. Generally the long chain aliphatic hydrocarbons of the present invention have melting points above above 40°C. Typical of long chain aliphatic hydrocarbons within the purview of the present invention are the following alkanes:

n-dodocane (44.4°C)
n-tetracosane (50.9°C)
n-octacosane (61.4°C)
n-dotriacontane (69.7°C)

n-hexatriacontane (76.2°C)
n-docosane (44°C.)
n-tricosane (47.3°C)
n-hexacosane (56.0°C)
n-nonacosane (65°C)

Any and all of the above listed hydrocarbons can be used singularly or in combination within the purview of the present invention.

The coating mixture will be normally applied to the transparent film material in the form of a solution and because of this, the choice of solvents to provide the solution is important, relative to the coating composition, since it must not cloud or change the film material and it must at the same time provide enough solubility for the coating composition to provide a clear uniform coating on the transparency with no evidence of component insolubility.

Suitable solvents for the long chain aliphatic hydrocarbons are those organic liquids which will dissolve the compounds but which are nonsolvents for and nondestructive of the substrate material. The solvent composition found to be suitable for use with the present compounds and for their application to transparencies produced therewith are hydrocarbon solvents such as hexane, heptane and other low boiling organic solvents. Additionally, low boiling petroleum fractions can be used. And further, mixtures of these conventional solvents may be employed to attain the requisite coating on the transparency. Aside from the selection features mentioned above, the particular solvent utilized is not critical to the transparencies formed within the purview of the present invention. It is only necessary that the proper amounts of the coating compounds are dissolved in the aforementioned solvent mixture and that a continuous film is formed on evaporation of the solvent. In this regard the compounds generally should be in a concentration of at least 0.3% by weight of the total coating composition (hydrocarbon compound and solvent).

It is, therefore, the selection of the particular long chain aliphatic hydrocarbon materials which is critical for proper fixing and adhesion of the multicolored xerographic image to the transparency. It is also these materials which allows correct reproduction of color density in the fused image, as well as giving strength to the film which is needed for sheet transfer during copying and continuous use of the transparency after formation. The compounds used must also be compatible with the multicomponent toners used for the subtractive color reproduction processes and accordingly prevent precipitation or deposition of the toner as discrete, recognizable, particles in the final developed image as opposed to coalescence and formation of a uniform and consistent toner film. If the toner is deposited as recognizable and discrete particles, then an image is produced which has a "dirty" or spotty look and the color density thus becomes eratic. The coating materials must therefore be compatible with the toner materials used to develop the multicolor images, while at the same time being transparent and yet strong enough to permit normal handling of transparencies.

The long chain aliphatic hydrocarbon materials which may be used in the coating composition of the present invention may be any commercially available form of these materials. Suitable for use, for example, is octacosane available from Eastman Kodak, Co. of Rochester, New York.

The coating composition after dissolution in the appropriate solvent mixture is applied to the transparent thermoplastic film by techniques which are well known to those skilled in the art of paper coating. Various techniques which are suitable for coating could be by roll, wire wound rod, air knife, or any other uniform application means used in paper coating. For instance, the coating may be simply passed (or dipped) through a hopper containing the coating composition in liquid form, which is provided by a doctor blade or the coating may be applied by use of a more precise coating apparatus such as a gravure press. Preferably a coating of between above about 0.1 mils thickness is produced upon the transparent thermoplastic film sheet after evaporation of a solvent or solidification of the dissolved hydrocarbon compounds. Since the polymeric coating on the sheet is in the nature of an extremely thin film, no significant impairment of the transparency of the sheet itself results from its presence and the transparency formed therefrom by electrostatic image, processes the requisite degree of clearness to be satisfactory for most visual education purposes.

The following represents a specific illustration of the present invention although it should be understood that the invention is not intended to be limited to specific details to be set forth thereon.

SPECIFIC EMBODIMENTS OF THE INVENTION

In the following illustrations two film types were used, LEXAN DL616 (a tetrachloro polycarbonate) and LEXAN SL1007 (a tetrabromo polycarbonate). The coatings on the transparencies were made by coating the films in the various solutions, air drying and curing at 150°–170°C. Prints were produced in a Xerox Model D processor (flat plate) using a premixed developer containing 10 g. of Xerox Cyan Toner, internally designated as XT 1318C-13, and 500 g. of carrier material, internally designated as XC910-20. Print fixing was accomplished in a Xerox Model D fuser which had temperatures ranging between 150°–170°C. The resulting transparencies were judged by projection using a "Telegraph-Resolute" mode 21105 overhead projector and rating on a transparency scale of from 1 to 10. Therefore, a rating of 1 indicates that no color whatsoever was visible on the projection screen while a rating of 10 indicates complete transparency.

One long chain aliphatic hydrocarbon material, octacosane, was analyzed in the aforementioned manner with the solvent being hexane. The color transparency rating was about 7, which can be considered better than acceptable for projectable color.

The hydrocarbon coated transparent sheet material is then subjected to a multicolored xerographic imaging process, as outlined above, with resultant heat fixing of the adherent image. It is observed that superior image adhesion occurred both before and after the fusion step. In addition, the colors reproduced are uniform, with consistent color density and with no evidence of toner spotting. Additionally, the colored transparencies of the instant invention are found to exhibit lower frictional and static properties when compared with the uncoated transparencies.

It can be seen from the example set forth that the transparencies which are coated with the instant coating compounds exhibits improved toner adhesion properties and therefore are capable of better color image projection than those transparencies containing no coat.

There will now be obvious to those skilled in the art many modifications and variations of the invention set forth above. These modifications and variations will not, however, depart from the scope of the invention if defined by the following claims.

What is claimed is:

1. A transparency for the formation of an adherent electrostatic image thereon comprising a thermoplastic film sheet, said sheet having at least one surface coated with a long chain aliphatic hydrocarbon having a melting point of above 40°C., said coating having a thickness of above 0.1 mil.

2. A transparency as set forth in claim 1 wherein the aliphatic hydrocarbon material is octacosane.

3. A transparency as set forth in claim 1 wherein said thermoplastic film sheet is a polysulfone, polycarbonate, or polyester material.

* * * * *